United States Patent Office 3,271,852
Patented Sept. 13, 1966

3,271,852
METHOD AND COMPOSITION FOR EXOTHERMIC BRAZING OF METAL JOINTS
Roger A. Long, San Diego, Calif., assignor to Whittaker Corporation, a corporation of California
No Drawing. Continuation of application Ser. No. 686,870, Sept. 30, 1957. This application Sept. 6, 1963, Ser. No. 306,993
17 Claims. (Cl. 29—494)

This application is a continuation of my copending application Serial No. 686,870, filed September 30, 1957, now abandoned.

This invention relates to a method of, and composition for, exothermic brazing of metal structures.

The principal object of this invention is to produce, by a new technique utilizing reactive metal compounds and combinations thereof, suitable brazed joints equivalent to those produced by the conventional methods of brazing.

A further object of this invention is to provide, and apply on joints to be welded, a series of materials, such as metals, alloy compounds, and the like, in combinations or in mixtures, which, when heated to relatively low temperature, react or dissociate with the evolution of heat at a sufficient temperature and in a sufficient amount to cause melting and flowing of a brazing material of a desired composition, which brazing material may be an alloy formed by a part of the metal of the composition or an alloy originally included in an intimate relationship to the metal compounds dissociating or reacting with an evolution of heat.

The method is based on the following factors:

The ability of metal compounds to react and/or dissociate with an evolution of heat.

The utilization of this heat to heat the surrounding metal structure of the area to be joined.

The producing where necessary a protective gas for the duration of the brazing cycle, or during the necessary portion of the brazing cycle, to protect the easily oxidizable metals in the structure being joined or in the brazing alloy, supplemented, if desired, by vacuum or outside introduction of inert or reducing gases.

The utilization of reaction heat to cause a melting of braze alloy components of the metal compound or mixtures or to cause a melting of a brazing alloy placed in intimate relationship to the heating source compounds.

The formation of a residue which is not detrimental to the application of the finished fabricated product such as being noncorrosive to the metal of the structure and/or the flowed braze alloy.

The formation of gaseous components which minimize the residue formation.

As a part of the procedure wherein a protective gas is produced, the choice of metal compound components is such that the protective gas is dissociated prior to the large heat evolution and is timed to provide protection prior to, and at the moment of, brazing alloy flow and solidification.

The above process has the following advantages over present methods:

(a) The cycle is faster and, therefore, braze alloy penetration is low and costs are low.

(b) No large and costly furnace equipment is required, and instead, brazing can be accomplished on heater tables, platen presses, or autoclaves with a minimum of tooling.

(c) Distortion of the final product is minimized because of the short heat cycle and the use of low cost restraining fixtures.

(d) Preplacing of brazing alloy can be simplified.

(e) The process is applicable to low melting braze alloys as well as high melting braze alloys.

(f) The cost of brazing alloy is low, as exact properties can be determined and excesses minimized.

(g) Heating costs and atmosphere gas costs are almost nonexistent when compared to conventional procedures.

In order to accomplish the first object of this invention, it was necessary to develop and utilize metal reacting compounds which, when heated to some low temperature, react and/or dissociate with an exothermic release of heat. It is necessary that these compounds have the following characteristics:

(a) They must initiate an exothermic reaction or dissociation at a temperature less than the melting point temperature of the brazing alloy.

(b) The heat given off must be sustained for a required minimum time period, this requirement varying according to the metal mass of the components being joined.

(c) One of the components dissociated should be a gas such as hydrogen, lithium, nitrogen, halogen, etc.

(d) The residue remaining from the reaction should be minimized and should have non-corrosive characteristics.

Since the process is particularly useful for very thin metal, it is illustrated using as an example stainless steel honeycomb in which the core is 0.002" thick and the skins are 0.003–0.005" thick.

(1) The core and the skins are cleaned by standard procedures to the cleanliness required for normal brazing methods.

(2) The compounds are assembled except for the one outer skin and the brazing alloy reaction powder mixture is distributed evenly in the cells of the core. The outer skin is then placed.

(3) The assembly is placed in restraining fixtures or in vacuum blankets to maintain desired shape.

(4) Assuming the temperature for initiating the reaction is 60° F., the assembly is placed between platens which are heated, or in an autoclave, and the entire assembly heated to the reaction temperature. Exothermic heat causes the brazing alloy to flow. Silver-copper-lithium melts and flows at about 1500–1700° F. The exothermic heat must be such as to sustain an average of this temperature through the portions to be brazed of each individual cell unit, and give enough heat input to melt the braze alloy.

(5) The assembly is then removed from the fixture, platen, etc., and inspected for continuity of bond.

(6) Alternates to the above procedure are preplacing brazing alloy separate from the reaction mixtures; preplacing brazing alloy-reaction mixture on the core adjacent to the joint to be made by the use of adhesive organic compounds; utilizing a vacuum or introducing a protective gas into the assembly; and utilizing alternate methods of heating to the initial reaction temperature.

An example of the operation of the invention is as follows:

(1) $Cu_2O$ and $Ag_2O$ were mixed in the relation to obtain an eutectic of 72% Ag and 28% Cu which has a melting point of 1436° F. In order to initiate a reaction and the reduction of the metal oxides lithium hydride was used as the agent.

(2) The powders, minus 325 mesh, were intimately mixed (excess lithium hydride added), and placed in a crucible. Ignition occurred by heating the crucible to below red heat (1000° F.). The temperature immediately increased to at least 2600° F. for approximately one to two seconds.

Results: Beads of eutectic copper silver ranging up to 1/16" in diameter were formed. Additional similar tests indicated ignition temperatures of less than 600° F.

A typical formula for this reaction is:

$Ax + y = xy + A$ and heat; where A is the metal or alloy desired to be formed, $x$ is a non-metallic element or radical, and $y$ is the reaction or reducing element.

It is of vital importance in the above process that choice of the correct elements and compounds be made. Separation of the desired alloy from the reaction products must be complete at the temperatures encountered in order to maintain braze alloy strength.

The following examples are given of typical reactions:

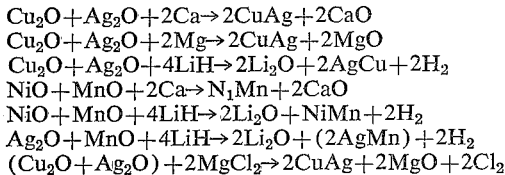

$Cu_2O + Ag_2O + 2Ca \rightarrow 2CuAg + 2CaO$
$Cu_2O + Ag_2O + 2Mg \rightarrow 2CuAg + 2MgO$
$Cu_2O + Ag_2O + 4LiH \rightarrow 2Li_2O + 2AgCu + 2H_2$
$NiO + MnO + 2Ca \rightarrow N_1Mn + 2CaO$
$NiO + MnO + 4LiH \rightarrow 2Li_2O + NiMn + 2H_2$
$Ag_2O + MnO + 4LiH \rightarrow 2Li_2O + (2AgMn) + 2H_2$
$(Cu_2O + Ag_2O) + 2MgCl_2 \rightarrow 2CuAg + 2MgO + 2Cl_2$ The number of combinations with final end results are numerous. It will be readily apparent to those skilled in the art that metal oxides and reducing agents other than those specifically mentioned herein may be used in combination according to the present invention. In fact, given the concept of the present invention, only routine experimentation is required to determine additional combinations of metal oxides and reducing agents which may be used in the present invention.

The use of hydrides and alloy hydride combinations appear to be the most desirable as a gas product is formed and hydrogen acts as a metal cleaning agent at temperatures over 1700° F.

Utilizing the hydride process, brazing alloy compounds can be produced which can later be reacted to eliminate the non-metallic element and create heat. The higher the heat of reaction the greater the separation of the resultant components. This is particularly desirable for the brazing application where one of the components is a liquid.

In addition to using compounds containing brazing alloy elements or brazing compounds, the use of brazing alloy in its commercially available base form and the use of reaction compounds just to produce heat is satisfactory and in some cases gives better results. An example is as follows:

(1) Commercially available silver-copper eutectic in foil form is placed in the joint to be brazed, such as in the stainless steel honeycomb structure, between the cells and the face plates.

(2) A mixture of NiO and calcium or lithium hydride in correct reacting proportions is added to the cells.

(3) Heating to reaction temperature causes an exothermic reaction to start at about 500° F. which increases the temperature to about 3000° F. for a duration of one to two seconds. This is sufficient to melt the brazing alloy and bond the cells to the skin.

This example shows the technique which can be used utilizing commercially available brazing alloy.

The selection of the reducing agent or the reacting agent, if no oxide or halide reduction is involved, generally, for ease of handling, consists of a reacting element in the form of a hydride. This is not necessary but very desirable. The elements which have been used are calcium, magnesium, zirconium, lithium, barium, aluminum, manganese and sodium. The alternate to reducing is the heat formed by reactions which give off heat, such as in the formation of inter-metallic metal compounds. The oxide or halide reduction is preferred.

It is necessary in most cases to prolong the heat of reaction to permit heating of the adjoining metal structure which is to be brazed.

This can be accomplished by selection of proportions, by selection of the elements and compounds reacting, by introducing a relatively inert compound to the mixture, and by changing particle sizes of the reacting components.

A higher heat of reaction can be obtained by further reacting the excessive amount of the reducing agent by an additional oxidizer. This supplements the heat and also increases the time period slightly.

It is apparent from the foregoing that the results may be obtained by applying to the metal pieces to be joined either a single composition containing both the brazing and reacting or dissociating components, or by applying to the metal pieces a brazing material in a commercially available form of sheets or powder and applying thereover or therewith a composition which is to react or dissociate to evolve the heat.

It is also apparent from the foregoing disclosure and examples that specific proportions of ingredients vary widely depending upon the type of brazed joint desired, and since the metal pieces to be brazed together, the material to be used as a braze, and the type of joint, each may be varied considerably in accordance with industrial needs, that specific relations rather than specific ingredients and arithmetical proportions thereof are controlling. The primary ones of these relations are that the braze material must be suitable for the particular pieces and joints desired; that the reactive or dissociative components should be capable of evolving heat to a sufficient temperature for effecting the melting and flow of the braze material, either as originally included or as formed by alloying of materials during the heat of reaction or dissociation, and that the reactive or dissociative components should be present in relation to the braze material in sufficient quantity to melt all of the braze material desired, and, where necessary, to heat the metal pieces to a desirable temperature for the brazing operation; that a protective agent or gas for the particular pieces and hot braze material be provided.

Further it is apparent that by the use of the present methods, the expensive furnaces and equipment heretofore required for brazing and handling articles of substantial size are unnecessary. Instead of such furnaces and the like, all that is required is very simple equipment and ample table or floor space on which to support the articles during brazing.

The method is found particularly useful for joining honeycomb structures of thin stainless steel, aluminum, and titanium, in which the honeycomb elements have a thickness usually ranging downwardly from .003 inch thickness as a maximum and in which the skin sheets or metal have a thickness ranging downwardly from about .015 inch maximum.

Having thus described my invention, I claim:

1. An exothermic brazing composition comprising a mixture of at least two metal oxides and a hydride reducing agent, said metal oxides and said hydride reducing agent being present in proportions which will react exothermically to substantially completely reduce said oxides to native metals while liberating hydrogen and to generate sufficient heat to cause said native metals to flow.

2. The composition of claim 1 wherein the reducing agent is selected from the group consisting of the hydrides of calcium, magnesium, zirconium, lithium, barium, aluminum, manganese and sodium.

3. The composition of claim 1 wherein said oxides are selected from the group consisting of copper oxide, silver oxide, nickel oxide and manganese oxide.

4. The composition of claim 3 wherein the reducing agent is selected from the group consisting of the hydrides of calcium, magnesium, zirconium, lithium, barium, aluminum, manganese and sodium.

5. A method of brazing two metal pieces comprising placing a material comprising a mixture of a plurality of metal oxides and a hydride reducing agent capable of generating hydrogen protective gas in close proximity to the area of the metal pieces, the metal oxides and hydride reducing agent in said mixture being present in proportions which will react exothermically to substantially completely reduce the oxides to native metals and generate sufficient heat to cause said metals to flow; heating the material to a temperature below that necessary for brazing the materials but sufficient to initiate a reaction in said mixture; cleaning the metal pieces with the hydrogen gas formed by said reaction; allowing said reaction to continue until the heat produced by the reaction is sufficiently high to braze the metal pieces; and cooling said metals to solidify the braze, whereby substantially no residue other than a braze alloy remains.

6. The method of claim 5 wherein the hydride reducing agent is selected from the group consisting of the hydrides of calcium, magnesium, zirconium, lithium, barium, aluminum, manganese, and sodium.

7. The method of claim 5 wherein the oxides are selected from the group consisting of copper oxide, silver oxide, nickel oxide and manganese oxide.

8. The method of claim 7 wherein the hydride reducing agent is selected from the group consisting of the hydrides of calcium, magnesium, zirconium, lithium, barium, aluminum, manganese, and sodium.

9. A method of brazing a core to the skin of a honeycomb structure comprising placing at the juncture of the honeycomb core and the facing skin a composition including a plurality of metal oxides; depositing in close proximity to said juncture a hydride reducing agent capable of generating a protective gas, said metal oxides and said hydride reducing agent being positioned so as to be capable of reacting exothermically, said metal oxides and said hydride reducing agent being present in proportions which will react exothermically to substantially completely reduce said oxides to native metals and generate sufficient heat to cause said native metals to flow; heating said metal oxides and said reducing agent to a temperature below that necessary for brazing the metals but sufficient to initiate a reaction between the metal oxides and the reducing agent; cleaning the metals to be brazed with the hydrogen liberated by said reaction; allowing said reaction to continue until the heat produced by the reaction is sufficiently high to braze the metals to be brazed; and cooling said metals to solidify the braze whereby substantially no residue other than a braze alloy remains.

10. The method of claim 9 wherein the hydride reducing agent is selected from the group consisting of the hydrides of calcium, magnesium, zirconium, lithium, barium, aluminum, manganese, and sodium.

11. The method of claim 9 wherein the oxides are selected from the group consisting of copper oxide, silver oxide, nickel oxide and manganese oxide.

12. The method of claim 11 wherein the hydride reducing agent is selected from the group consisting of the hydrides of calcium, magnesium, zirconium, lithium, barium, aluminum, manganese and sodium.

13. A method of uniting two metal pieces comprising placing at the joint of said metal pieces a metallic composition, said composition comprising a mixture of a plurality of metal oxides and a hydride reducing agent, the metals of said oxides having melting points lower than either metal piece and higher than 900° F.; heating the metallic composition to a temperature sufficient to initiate the reaction between said metal oxides and reducing agent and to liberate hydrogen gas; allowing said reaction to continue until substantially all of the metal oxides are reduced to native metals and until the heat produced by the reaction is sufficiently high to allow such native metals to flow; and allowing said native metals to cool whereby said metal pieces are united.

14. The process of claim 13 wherein said hydride reducing agent is selected from the group consisting of the hydrides of calcium, magnesium, zirconium, lithium, barium, aluminum, manganese and sodium.

15. The process of claim 13 wherein said metal oxides are selected from the group consisting of copper oxide, silver oxide, nickel oxide and manganese oxide.

16. A method of uniting two metal pieces comprising placing at the joint of said metal pieces a metallic composition comprising a mixture of a plurality of metal oxides and a hydride reducing agent, said metal oxides being selected from the group consisting of the oxides of copper, silver, nickel and manganese, said hydride reducing agent being selected from the group consisting of the hydrides of calcium, magnesium, zirconium, lithium, barium, aluminum, manganese, and sodium; heating the metallic composition to a temperature sufficient to initiate the reaction between said metal oxides and reducing agent whereby hydrogen gas is liberated and serves to clean the metal surfaces; allowing said reaction to continue until substantially all of the metal oxides are reduced to native metals and until the heat produced by the reaction is sufficiently high to allow such native metals to flow; and allowing said native metals to cool whereby said metal pieces are united.

17. The process of claim 16 wherein said metal pieces comprise ferrous metals.

References Cited by the Examiner

UNITED STATES PATENTS

| | | | |
|---|---|---|---|
| 1,872,254 | 8/1932 | De Golyer | 29—504 |
| 2,351,798 | 6/1944 | Alexander | 117—22 |
| 2,463,342 | 3/1949 | Wiczer | 29—528 |
| 2,822,609 | 2/1958 | Horvitz | 29—503 |
| 3,116,142 | 12/1963 | Reylander et al. | 29—498.5 |

JOHN F. CAMPBELL, *Primary Examiner.*

P. M. COHEN, *Assistant Examiner.*